United States Patent
Barges et al.

(10) Patent No.: US 12,247,274 B2
(45) Date of Patent: *Mar. 11, 2025

(54) METHOD OF PRODUCTION OF A COLD ROLLED AND HEAT TREATED STEEL SHEET TO PRODUCE VEHICLE PARTS

(71) Applicant: ArcelorMittal, Luxembourg (LU)

(72) Inventors: Patrick Barges, Rozerieulles (FR); Ian Alberto Zuazo Rodriguez, Saint Vallier (FR)

(73) Assignee: ArcelorMittal, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 17/060,493

(22) Filed: Oct. 1, 2020

(65) Prior Publication Data
US 2021/0025041 A1     Jan. 28, 2021

Related U.S. Application Data

(62) Division of application No. 16/466,959, filed as application No. PCT/IB2016/057941 on Dec. 22, 2016.

(51) Int. Cl.
*C22C 38/04*     (2006.01)
*C21D 6/00*      (2006.01)
(Continued)

(52) U.S. Cl.
CPC .............. *C22C 38/04* (2013.01); *C21D 6/005* (2013.01); *C21D 8/0236* (2013.01);
(Continued)

(58) Field of Classification Search
None
See application file for complete search history.

(56) References Cited

U.S. PATENT DOCUMENTS 9,533,713 B2   1/2017  Steffens et al.
10,400,315 B2  9/2019  Del Frate et al.
(Continued)

FOREIGN PATENT DOCUMENTS

CN    101638749 A   2/2010
CN    103820735 A   5/2014
(Continued)

OTHER PUBLICATIONS

English language machine translation of CN-104928568-A. Generated Jan. 26, 2023. (Year: 2023).*

(Continued)

*Primary Examiner* — Brian D Walck
(74) *Attorney, Agent, or Firm* — Davidson Kappel LLC

(57) ABSTRACT

A method of production of a cold rolled and heat treated steel sheet has the following steps: providing a cold rolled steel sheet with a composition including the following elements, expressed in percent by weight: 0.15%≤carbon≤0.6%, 4%≤manganese≤20%, 5%≤aluminum≤15%, 0≤silicon≤2%, aluminum+ silicon≥6.5%, a remainder being composed of iron and unavoidable impurities caused by processing; heating said cold rolled steel sheet up to a soaking temperature between 80° and 950° C. during less than 600 seconds, then cooling the sheet down to a temperature in a range of 600° C. to room temperature, reheating the steel sheet to a soaking temperature of 150° C. to 600° C. during 10 s to 250 h, then cooling the sheet.

30 Claims, 1 Drawing Sheet

(51) Int. Cl.
- *C21D 8/02* (2006.01)
- *C22C 38/02* (2006.01)
- *C22C 38/06* (2006.01)
- *C22C 38/08* (2006.01)
- *C22C 38/12* (2006.01)
- *C22C 38/14* (2006.01)
- *C22C 38/16* (2006.01)

(52) U.S. Cl.
CPC ............ *C21D 8/0247* (2013.01); *C22C 38/02* (2013.01); *C22C 38/06* (2013.01); *C22C 38/08* (2013.01); *C22C 38/12* (2013.01); *C22C 38/14* (2013.01); *C22C 38/16* (2013.01); *C21D 2211/001* (2013.01); *C21D 2211/004* (2013.01); *C21D 2211/005* (2013.01)

(56) References Cited

U.S. PATENT DOCUMENTS

| | | | |
|---|---|---|---|
| 2009/0297387 A1 | 12/2009 | Chin et al. | |
| 2014/0007992 A1 | 1/2014 | Balichev et al. | |
| 2014/0087208 A1 | 3/2014 | Toda et al. | |
| 2014/0363694 A1 | 12/2014 | Lie et al. | |
| 2015/0147221 A1 | 5/2015 | Perlade et al. | |
| 2016/0168672 A1 | 6/2016 | Kobayashi et al. | |
| 2016/0194739 A1* | 7/2016 | Del Frate | B32B 15/043 148/277 |
| 2016/0319388 A1 | 11/2016 | Kim et al. | |
| 2019/0345590 A1 | 11/2019 | Barges et al. | |

FOREIGN PATENT DOCUMENTS

| | | | |
|---|---|---|---|
| CN | 103827338 A | | 5/2014 |
| CN | 104350169 A | | 2/2015 |
| CN | 104928568 A | * | 9/2015 |
| CN | 105358719 A | | 2/2016 |
| CN | 106068333 | | 11/2016 |
| CN | 106068333 A | | 11/2016 |
| JP | 2005015909 A | | 1/2005 |
| JP | 4235077 B2 | | 3/2009 |
| JP | 2009287114 A | | 12/2009 |
| JP | 2013237923 A | * | 11/2013 |
| JP | 2014505172 A | | 2/2014 |
| JP | 2016041579 A | | 3/2016 |
| JP | 2020509213 A | | 3/2020 |
| KR | 20140085088 A | | 7/2014 |
| KR | 20160027105 A | | 3/2016 |
| RU | 2552808 C1 | | 6/2015 |
| WO | 2013034317 A1 | | 3/2013 |
| WO | 2014038759 A1 | | 3/2014 |
| WO | 2015001367 A1 | | 1/2015 |
| WO | WO2015012357 A1 | | 1/2015 |

OTHER PUBLICATIONS

English language machine translation of JP-2013237923-A. Generated Jan. 26, 2023. (Year: 2023).*

International Search Report issued in connection with International application No. PCT/IB2016/057941 on Sep. 28, 2017.

Okamoto et al. "Intermediate Phases." ASM Handbook, vol. 3, Alloy Phase Diagrams. pp. 71-77. 2016. (Year: 2016).

* cited by examiner

METHOD OF PRODUCTION OF A COLD ROLLED AND HEAT TREATED STEEL SHEET TO PRODUCE VEHICLE PARTS

CROSS REFERENCE TO RELATED APPLICATIONS

This is a Divisional of U.S. patent application Ser. No. 16/466,959 filed Jun. 5, 2019, which is a national phase application of PCT/IB2016/057941, filed Dec. 22, 2016; both of which are hereby incorporated by reference herein.

FIELD OF THE INVENTION

The present invention relates to a low density steel having a tensile strength greater than or equal to 600 MPa with uniform elongation of greater than or equal to 9%, suitable for automotive industry and a method for manufacturing thereof.

BACKGROUND

Environmental restrictions are forcing automakers to continuously reduce the $CO_2$ emissions of their vehicles. To do that, automakers have several options, whereby their principal options are to reduce the weight of the vehicles or to improve the efficiency of their engine systems. Advances are frequently achieved by a combination of the two approaches.

The present invention is directed in part to the first option, namely the reduction of the weight of the motor vehicles. In this very specific field, there is a two-track alternative.

The first track reduces the thicknesses of the steels while increasing their levels of mechanical strength. Unfortunately, this solution has its limits on account of a prohibitive decrease in the rigidity of certain automotive parts and the appearance of acoustical problems that create uncomfortable conditions for the passenger, not to mention the unavoidable loss of ductility associated with the increase in mechanical strength.

The second track reduces the density of the steels by alloying them with other, lighter metals. Among these alloys, the low-density ones called iron-aluminum alloys have attractive mechanical and physical properties while making it possible to significantly reduce the weight. In this case, low density means a density less than or equal to 7.4.

JP 2005/015909 describes a low density TWIP steels with very high manganese contents of over 20% and also containing aluminum up to 15%, resulting in a lighter steel matrix, but the steel disclosed presents a high deformation resistance during rolling together with weldability issues.

SUMMARY OF THE INVENTION

An object of various embodiments of the present invention is to provide cold-rolled steel sheets that simultaneously have:
 a density less than or equal to 7.4,
 an ultimate tensile strength greater than or equal to 900 MPa and preferably equal or above 1000 MPa, and
 an uniform elongation greater than or equal to 9%.

An additional object of various embodiments of the present invention is to provide steel sheets that also have a good suitability for forming, in particular for rolling and a good weldability and good coatability.

Another object of various embodiments of the present invention is to provide a method for the manufacturing of these sheets that is compatible with conventional industrial applications while being robust towards manufacturing parameters shifts.

The present invention provides a cold rolled and heat treated steel sheet having a composition comprising the following elements, expressed in percent by weight:
 0.15%≤carbon≤0.6%,
 4%≤manganese≤20%,
 5%≤aluminum≤15%,
 0≤silicon≤2%,
 aluminum+ silicon≥6.5%,
 the remainder being composed of iron and unavoidable impurities caused by processing,
 wherein the microstructure of said steel sheet comprises in area fraction, 10 to 50% of austenite, the reminder being regular ferrite and ordered ferrite of $DO_3$ structure. In some embodiments, the steel sheet further comprises one or more of the following elements:
 0.01%≤niobium≤0.3%,
 0.01%≤titanium≤0.2%,
 0.01%≤vanadium≤0.6%,
 0.01%≤copper≤2.0%,
 0.01%≤nickel≤2.0%,
 cerium≤0.1%,
 boron≤0.01%,
 magnesium≤0.05%,
 zirconium≤0.05%,
 molybdenum≤2.0%,
 tantalum≤2.0%,
 tungsten≤2.0%.

In some embodiments, said austenite phase includes intragranular kappa carbides. In some embodiments, the steel sheet comprises up to 2% of intragranular kappa carbides. In some embodiments, aluminum, manganese and carbon amounts are such that $0.3<(Mn/2Al) \times \exp(C)<2$. In some embodiments, the manganese content is between 7 and 15%. In some embodiments, the aluminum content is equal or higher than 7%, and kappa carbides concentration is higher than 1%. In some embodiments, the steel sheet has a density of less than or equal to 7.4, an ultimate tensile strength higher than or equal to 900 MPa and a uniform elongation higher than or equal to 9%.

The present invention further provides a method of production of a cold rolled and heat treated steel sheet comprising the following steps:
 providing a cold rolled steel sheet with a composition comprising the following elements, expressed in percent by weight:
  0.15%≤carbon≤0.6%,
  4%≤manganese≤20%,
  5%≤aluminum≤15%,
  0≤silicon≤2%,
  aluminum+ silicon≥6.5%,
  the remainder being composed of iron and unavoidable impurities caused by processing,
 heating said cold rolled steel sheet up to a soaking temperature between 80° and 950° C. during less than 600 seconds, then cooling the sheet down to a temperature in a range of 600° C. to room temperature,
 reheating the steel sheet to a soaking temperature of 150° C. to 600° C. during 10 s to 250 h, then cooling the sheet.

The present invention also provides parts or vehicles comprising a cold rolled steel sheet according to various embodiments of the present invention.

BRIEF DESCRIPTION OF THE DRAWINGS

FIG. 1 (b) shows corresponding diffraction pattern, zone axis D0$_3$. Arrow indicates the reflection used for the dark field image in FIG. 1 (a).

DETAILED DESCRIPTION

Figure 1A:
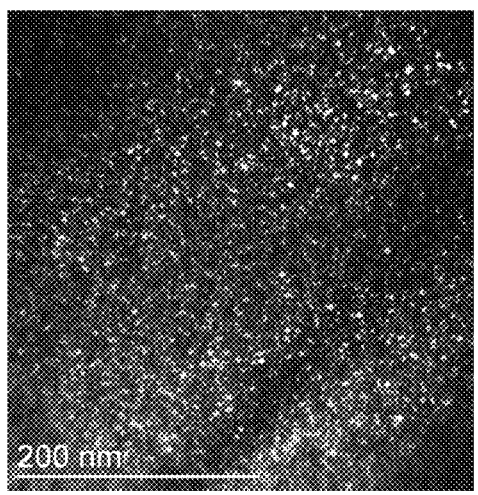
FIG. 1 (a) is a dark field image of $DO_3$ structure of a sample from trial E.

In order to obtain the desired steel of present invention, the composition is of significant importance; therefore the detailed explanation of the composition is provided in the following description.

Carbon content is between 0.15% and 0.6% and acts as a significant solid solution strengthening element. It also enhances the formation of kappa carbides (Fe,Mn)$_3$AlC$_x$. Carbon is an austenite-stabilizing element and triggers a strong reduction of the martensitic transformation temperature Ms, so that a significant amount of residual austenite is secured, thereby increasing plasticity. Maintaining carbon content in the above range, ensure to provide the steel sheet with the required levels of the strength and ductility. It also allows reducing the manganese content while still obtaining some TRIP effect.

Manganese content must be between 4% and 20%. This element is gammagenous. The purpose of adding manganese is essentially to obtain a structure that contains austenite in addition to ferrite and to stabilize it at room temperature. The ratio of the manganese content to the aluminum content will have a strong influence on the structures obtained after hot rolling. With a manganese content under 4, the austenite will be insufficiently stabilized with the risk of premature transformation into martensite during cooling at the exit from the annealing line. Moreover, addition of manganese increases the D0$_3$ domain, allowing getting enough precipitation of D0$_3$ at higher temperatures and/or at lower amounts of aluminum. Above 20%, there is a reduction in the fraction of ferrite which adversely affects the present invention, as it may make it more difficult to reach the required tensile strength. In a preferred embodiment, the addition of manganese will be limited to 17%.

The aluminum content is between 5% and 15%, preferably between 5.5% and 15%. Aluminum is an alphagenous element and therefore tends to promote the formation of ferrite and in particular of ordered ferrite (Fe,Mn,X)$_3$Al of D0$_3$ structure (X is any solute additions, e.g. Si, that dissolves in D0$_3$). The aluminum has a density of 2.7 and has an important influence on the mechanical properties. As the aluminum content increases, the mechanical strength and the elastic limit also increase although the uniform elongation decreases, due to the decrease in the mobility of dislocations. Below 4%, the density reduction due to the presence of aluminum becomes less beneficial. Above 15%, the presence of ordered ferrite increases beyond the expected limit and affects the present invention negatively, as it starts imparting brittleness to the steel sheet. Preferably, the aluminum content will be limited to less than 9% to prevent the formation of additional brittle intermetallic precipitation.

In addition to the above features, in certain embodiments, manganese, aluminum and carbon contents respect the following relationship:

$$0.3 < (Mn/2Al) \times exp(C) < 2.$$

Below 0.3, there is a risk that austenite amount is too low, possibly leading to insufficient ductility. Above 2, it may be possible that the austenite volume fraction goes higher than 49%, thereby reducing the potential of the precipitation of D0$_3$ phase.

Silicon is an element that allows reducing the density of the steel and is also effective in solid solution hardening. It further has a positive effect of stabilizing D0$_3$ versus B2 phase. Its content is limited to 2.0% because above that level this element has a tendency to form strongly adhesive oxides that generate surface defects. The presence of surface oxides impairs the wettability of the steel and may produce defects during a potential hot-dip galvanizing operation. In a preferred embodiment, the silicon content will preferably be limited to 1.5%.

The inventors have found out that the cumulated amounts of silicon and aluminum had to be at least equal to 6.5% to obtain the results expected in terms of precipitation of D0$_3$.

Niobium may be added as an optional element in an amount of 0.01 to 0.1% to the steel of present invention to provide grain refinement. The grain refinement allows obtaining a good balance between strength and elongation and is believed to contribute to improved fatigue performance. But, niobium had a tendency to retard the recrystallization during hot rolling and is therefore not always a desirable element. Therefore it is kept as an optional element.

Titanium may be added as an optional element in an amount of 0.01% to 0.1% to the steel of present invention for grain refinement, in a similar manner as niobium. It further has a positive effect of stabilizing D0$_3$ versus B2 phase. Therefore, the unbounded part of titanium that is not precipitated as nitride, carbide or carbonitride will stabilize the D0$_3$ phase.

Vanadium may be added as an optional element in an amount of 0.01% to 0.6%. When added, vanadium can form fine carbo-nitrides compounds during the annealing, these carbo-nitrides providing additional hardening. It further has a positive effect of stabilizing D03 versus B2 phase. Therefore, the unbounded part of vanadium that is not precipitated as nitride, carbide or carbonitride will stabilize the D0$_3$ phase.

Copper may be added as an optional element in an amount of 0.01% to 2.0% to increase the strength of the steel and to improve its corrosion resistance. A minimum of 0.01% is required to get such effects. However, when its content is above 2.0%, it can degrade the surface aspect.

Nickel may be added as an optional element in an amount of 0.01 to 3.0% to increase the strength of the steel and to improve its toughness. A minimum of 0.01% is required to get such effects. However, when its content is above 3.0%, it tends to stabilize B2 which would be detrimental to D0$_3$ formation.

Other elements such as cerium, boron, magnesium or zirconium can be added individually or in combination in the following proportions: cerium≤0.1%, B≤0.01, Mg≤0.05 and Zr≤0.05. Up to the maximum content levels indicated, these elements make it possible to refine the ferrite grain during solidification.

Finally, molybdenum, tantalum and tungsten may be added to stabilize the D0$_3$ phase further. They can be added individually or in combination up to maximum content levels: Mo≤2.0, Ta≤2.0, W≤2.0. Beyond these levels the ductility is compromised.

The microstructure of the sheet claimed by the invention comprises, in area fraction, 10 to 50% of austenite, said austenite phase optionally including intragranular (Fe,Mn)$_3$AlC$_x$ kappa carbides, the reminder being ferrite, which includes regular ferrite and ordered ferrite of D0$_3$ structure and optionally up to 2% of intragranular kappa carbides.

Below 10% of austenite, the uniform elongation of at least 9% cannot be obtained.

Regular ferrite is present in the steel of present invention to impart the steel with high formability and elongation and also, to a certain degree, some resistance to fatigue failure.

$D0_3$ ordered ferrite in the frame of the present invention, is defined by intermetallic compounds whose stoichiometry is $(Fe,Mn,X)_3Al$. The ordered ferrite is present in the steel of present invention with a minimum amount of 0.1% in area fraction, preferably of 0.5%, more preferably of 1.0% and advantageously of more than 3%. Preferably, at least 80% of such ordered ferrite has an average size below 30 nm, preferably below 20 nm, more preferably below 15 nm, advantageously below 10 nm or even below 5 nm. This ordered ferrite is formed during the second annealing step providing strength to the alloy by which the levels of 900 MPa can be reached. If ordered ferrite is not present, the strength level of 900 MPa cannot be reached.

Kappa carbide, in the frame of the present invention, is defined by precipitates whose stoichiometry is $(Fe,Mn)_3AlC_x$, where x is strictly lower than 1. The area fraction of kappa carbides inside ferrite grains can go up to 2%. Above 2%, the ductility decreases and uniform elongation above 9% is not achieved. In addition, uncontrolled precipitation of Kappa carbide around the ferrite grain boundaries may occur, increasing, as a consequence, the efforts during hot and/or cold rolling. The kappa carbide can also be present inside the austenite phase, preferably as nano-sized particles with a size below 30 nm.

The steel sheets according to the invention can be obtained by any suitable process. It is however preferable to use the method according to the invention that will be described.

In an embodiment, a process according to the invention includes providing a semi-finished casting of steel with a chemical composition within the range of the invention as described above. The casting can be done either into ingots or continuously in form of slabs or thin strips.

For the purpose of simplification, the process according to an embodiment of the invention will be further described taking the example of slab as a semi-finished product. The slab can be directly rolled after the continuous casting or may be first cooled to room temperature and then reheated.

The temperature of the slab which is subjected to hot rolling must be below 1280° C., because above this temperature, there would be a risk of formation of rough ferrite grains resulting in coarse ferrite grain which decreases the capacity of these grains to re-crystallize during hot rolling. The larger the initial ferrite grain size, the less easily it re-crystallizes, which means that reheat temperatures above 1280° C. must be avoided because they are industrially expensive and unfavorable in terms of the recrystallization of the ferrite. Coarse ferrite also has a tendency to amplify the phenomenon called "roping".

It is desired to perform the rolling with at least one rolling pass in the presence of ferrite. The purpose is to enhance partition of elements that stabilize austenite into austenite, to prevent carbon saturation in the ferrite, which can lead to brittleness. The final rolling pass is performed at a temperature greater than 800° C., because below this temperature the steel sheet exhibits a significant drop in rollability.

In an embodiment of the present invention, the temperature of the slab is sufficiently high so that hot rolling can be completed in the inter-critical temperature range and final rolling temperature remains above 850° C. A final rolling temperature between 850° C. and 980° C. is preferred to have a structure that is favorable to recrystallization and rolling. It is preferred to start rolling at a temperature of the slab above 900° C. to avoid excessive load that may be imposed on a rolling mill.

The sheet obtained in this manner is then cooled at a cooling rate, preferably less than or equal to 100° C./s down to the coiling temperature. Preferably, the cooling rate will be less than or equal to 60° C./s.

The hot rolled steel sheet is then coiled at a coiling temperature below 600° C., because above that temperature there is a risk that it may not be possible to control the kappa carbide precipitation inside ferrite up to a maximum of 2%. A coiling temperature above 600° C. will also result in significant decomposition of the austenite making it difficult to secure the required amount of such phase. Therefore the preferable coiling temperature for the hot rolled steel sheet of the present invention is between 400° C. and 550° C.

An optional hot band annealing can be performed at temperatures between 400° C. and 1000° C. It can be a continuous annealing or a batch annealing. The duration of the soaking will depend on whether it is continuous annealing (between 50 s and 1000 s) or batch annealing (between 6 h and 24 h).

The hot rolled sheets are then cold rolled with a thickness reduction between 35 to 90%.

The obtained cold rolled steel sheet is then subjected to a two-step annealing treatment to impart the steel with targeted mechanical properties and microstructure.

In the first annealing step, the cold rolled steel sheet is heated at a heating rate which is preferably greater than 1° C./s to a holding temperature between 800° C. and 950° C. for a duration less than 600 seconds to ensure a re-crystallization rate greater than 90% of the strongly work hardened initial structure. The sheet is then cooled to the room temperature whereby preference is given to a cooling rate greater than 30° C./s in order to control kappa carbides inside ferrite.

The cold rolled steel sheet obtained after first annealing step can, for example, then again reheated at a heating rate of at least 10° C./h to a holding temperature between 150° C. and 600° C. for a duration between 300 seconds and 250 hours and then cooled down to room temperature. This is done to effectively control the formation of D03 ordered ferrite and, possibly, of kappa carbides inside austenite. Duration of holding depends upon on the temperature used.

An additional heat treatment to facilitate hot dip coating with zinc may be optionally performed. In this additional heat treatment, the steel sheet is reheated to a temperature of 460 to 500° C. Such treatment does not alter any of the mechanical properties or microstructure of the steel sheet.

EXAMPLES

The following tests, examples, figurative exemplification and tables which are presented herein are non-restricting in nature and must be considered for purposes of illustration only, and will display the advantageous features of the present invention.

Samples of the steel sheets according to the invention and to some comparative grades were prepared with the compositions gathered in table 1 and the processing parameters gathered in table 2. The corresponding microstructures of those steel sheets were gathered in table 3.

TABLE 1

Compositions

| Grade | C | Mn | Al | Si | Cu | S | P | (Mn/2Al)*exp(C) |
|---|---|---|---|---|---|---|---|---|
| 1 | 0.19 | 8.4 | 6.1 | 0.91 | — | 0.005 | 0.017 | 0.83 |
| 2 | 0.19 | 8.4 | 6.2 | 0.94 | 1.10 | 0.005 | 0.017 | 0.82 |
| 3 | 0.22 | 8.2 | 7.8 | 0.27 | — | <0.001 | 0.030 | 0.65 |
| 4 | 0.29 | 6.5 | 5.9 | 0.90 | — | 0.005 | 0.020 | 0.74 |
| 5 | 0.30 | 6.6 | 5.8 | 1.2 | — | 0.004 | 0.015 | 0.77 |

TABLE 2

Process parameters

Hot and cold rolling parameters

| Trial | Grade | Reheating T (° C.) | FR T (° C.) | Cooling rate (° C./s) | Coiling T (° C.) | CR (%) |
|---|---|---|---|---|---|---|
| A | 1 | 1150 | 920 | 60 | 450 | 75 |
| B* | 1 | 1150 | 920 | 60 | 450 | 75 |
| C* | 1 | 1150 | 920 | 60 | 450 | 75 |
| D | 2 | 1150 | 920 | 60 | 450 | 75 |
| E* | 2 | 1150 | 920 | 60 | 450 | 75 |
| F* | 2 | 1150 | 920 | 60 | 450 | 75 |
| G | 3 | 1180 | 905 | 50 | 500 | 75 |
| H* | 3 | 1180 | 905 | 50 | 500 | 75 |
| I* | 3 | 1180 | 905 | 50 | 500 | 75 |
| J | 4 | 1200 | 950 | 60 | 450 | 75 |
| K* | 4 | 1200 | 950 | 60 | 450 | 75 |
| L | 5 | 1150 | 940 | 100 | 450 | 75 |
| M* | 5 | 1150 | 940 | 100 | 450 | 75 |
| N | 5 | 1150 | 940 | 100 | 450 | 75 |
| O* | 5 | 1150 | 940 | 100 | 450 | 75 |

Annealing parameters

| | | First annealing step | | | Second annealing step | |
|---|---|---|---|---|---|---|
| Trial | Grade | T (° C.) | t (s) | Cooling rate (° C./s) | T (° C.) | t (h) |
| A | 1 | 850 | 136 | 100 | — | — |
| B* | 1 | 850 | 136 | 100 | 400 | 72 |
| C* | 1 | 850 | 136 | 100 | 400 | 110 |
| D | 2 | 850 | 136 | 100 | — | — |
| E* | 2 | 850 | 136 | 100 | 400 | 72 |
| F* | 2 | 850 | 136 | 100 | 400 | 110 |
| G | 3 | 850 | 136 | 100 | — | — |
| H* | 3 | 850 | 136 | 100 | 400 | 48 |
| I* | 3 | 850 | 136 | 100 | 400 | 72 |
| J | 4 | 900 | 136 | 100 | — | — |
| K* | 4 | 900 | 136 | 100 | 400 | 110 |
| L | 5 | 850 | 136 | 65 | — | — |
| M* | 5 | 850 | 136 | 65 | 400 | 72 |
| N | 5 | 900 | 136 | 65 | — | — |
| O* | 5 | 900 | 136 | 65 | 400 | 72 |

*according to the invention

TABLE 3

Microstructures

| Trial | Grade | Austenite including Kappa (%) | Kappa in austenite | Regular ferrite + D0$_3$ ferrite (%) | Kappa in ferrite (%) | D0$_3$ ferrite |
|---|---|---|---|---|---|---|
| A | 1 | 25 | Yes ** | 75 | — | No |
| B* | 1 | 25 | Yes ** | 75 | — | Yes |
| C* | 1 | 25 | — | 75 | — | Yes |
| D | 2 | 25 | Yes ** | 75 | — | No |
| E* | 2 | 25 | Yes ** | 75 | — | Yes |
| F* | 2 | 25 | — | 75 | — | Yes |
| G | 3 | 18 | Yes | 80 | 2 | No |
| H* | 3 | 18 | Yes | 80 | 2 | Yes |
| I* | 3 | 18 | — | 80 | 2 | Yes |
| J | 4 | 31 | Yes ** | 69 | — | No |
| K* | 4 | 32 | — | 68 | — | Yes |
| L | 5 | 34 | Yes ** | 66 | — | No |
| M* | 5 | 34 | — | 66 | — | Yes |
| N | 5 | 35 | Yes ** | 65 | — | No |
| O* | 5 | 35 | — | 65 | — | Yes |

Figure 1B:
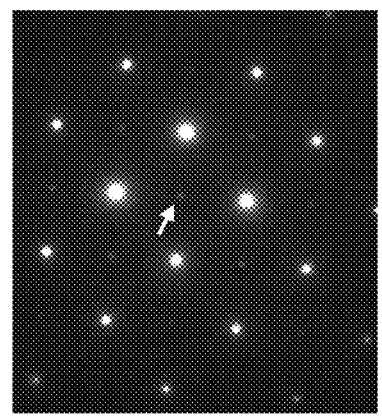

** Early stages of Kappa precipitation in austenite detected by transmission electron microscopy Some microstructure analyses were performed on samples from trial E and images of D0$_3$ structure are reproduced on FIGS. 1 (a) and 1 (b):
  (a) Dark field image of D0$_3$ structure
  (b) Corresponding diffraction pattern, zone axis D0$_3$. Arrow indicates the reflection used for the dark field image in (a)

The properties of those steel sheets were then evaluated, the results being gathered in table 4.

TABLE 4

Properties

| Trial | Grade | YS (MPa) | UTS (MPa) | UE (%) | TE (%) | Density |
|---|---|---|---|---|---|---|
| A | 1 | 623 | 788 | 17.6 | 28.5 | 7.16 |
| B* | 1 | 870 | 1008 | 9.6 | 16.6 | 7.16 |
| C* | 1 | 900 | 1034 | 9.3 | 16.2 | 7.16 |
| D | 2 | 626 | 788 | 16.3 | 25.8 | 7.15 |
| E* | 2 | 899 | 1041 | 9.3 | 15.1 | 7.15 |
| F* | 2 | 916 | 1068 | 9.1 | 13 | 7.15 |
| G | 3 | 633 | 774 | 15.5 | 24.4 | 7.02 |
| H* | 3 | 771 | 902 | 10 | 18.9 | 7.02 |
| I* | 3 | 787 | 913 | 9.4 | 19 | 7.02 |
| J | 4 | 633 | 795 | 18.1 | 29.4 | 7.18 |
| K* | 4 | 849 | 976 | 10.8 | 18.2 | 7.18 |
| L | 5 | 692 | 851 | 17.9 | 28.5 | 7.18 |
| M* | 5 | 878 | 1024 | 11 | 18.8 | 7.21 |
| N | 5 | 655 | 840 | 19.5 | 31.3 | 7.21 |
| O* | 5 | 861 | 1014 | 11.8 | 20.7 | 7.21 |

The examples show that the steel sheets according to the invention are the only one to show all the targeted properties thanks to their specific composition and microstructures.

What is claimed is:

1. A method of production of a cold rolled and heat treated steel sheet comprising the following steps:
    providing a cold rolled steel sheet with a composition consisting of the following elements, expressed in percent by weight:
    0.15%≤carbon≤0.6%,
    4%≤manganese≤20%,
    5%≤aluminum≤15%,
    0≤silicon≤2%,
    aluminum+ silicon≥6.5%,
    optionally one or more elements selected from the group consisting of niobium, titanium, vanadium, copper, nickel, cerium, boron, magnesium, zirconium, molybdenum, tantalum, tungsten, sulfur, and phosphorus, a remainder being composed of iron and unavoidable impurities caused by processing;

heating said cold rolled steel sheet up to a soaking temperature between 80° and 950° C. for a duration of less than 600 seconds, then cooling the sheet down to room temperature, reheating the steel sheet at a heating rate of at least 10° C./h to a soaking temperature of 150° C. to 600° C. for a duration of 10 s to 250 h, then cooling the sheet to room temperature, wherein after the reheating the steel sheet has an ultimate tensile strength higher than 900 MPa, and a microstructure of the steel sheet consisting of, in area fraction, 10 to 50% of austenite, at least 0.1% of ordered ferrite of $DO_3$ structure, a remainder of the microstructure being regular ferrite and optionally up to 2% of intragranular kappa carbides.

2. The method as recited in claim 1 wherein after the reheating a microstructure of the steel sheet consists in area fraction, 10 to 50% of austenite, a remainder of the microstructure being regular ferrite and ordered ferrite of $DO_3$ structure.

3. The method as recited in claim 1 wherein aluminum, manganese and carbon amounts are such that $0.3<(Mn/2Al) \times \exp(C)<2$.

4. The method as recited in claim 1 wherein the manganese content is between 7 and 15%.

5. The method as recited in claim 1 the aluminum content of the composition is equal or higher than 7%, and wherein a microstructure after the reheating includes in area fraction a kappa carbides concentration higher than 1%.

6. The method as recited in claim 1 wherein after the reheating the steel sheet has a density of less than or equal to 7.4 g/cm$^3$ and a uniform elongation higher than or equal to 9%.

7. A method for the manufacture of structural or safety parts of a vehicle comprising the method as recited in claim 1.

8. The method as recited in claim 1 wherein the composition consists of the following elements, expressed in percent by weight:

0.15%≤carbon≤0.6%,
4%≤manganese≤20%,
5%≤aluminum≤15%,
0≤silicon≤2%,
aluminum+ silicon≥6.5%, and
one or more of the following elements:
0.01%≤niobium≤0.3%,
0.01%≤titanium≤0.2%,
0.01%≤vanadium≤0.6%,
0.01%≤copper≤2.0%,
0.01%≤nickel≤2.0%,
cerium≤0.1%,
boron≤0.01%,
magnesium≤0.05%,
zirconium≤0.05%,
molybdenum≤2.0%,
tantalum≤2.0%,
tungsten≤2.0%,
sulfur,
phosphorous,
a remainder being composed of iron and unavoidable impurities caused by processing.

9. The method as recited in claim 2 wherein the austenite phase includes intragranular kappa carbides.

10. The method as recited in claim 2 wherein the microstructure includes up to 2% of intragranular kappa carbides inside ferrite grains.

11. The method as recited in claim 1, wherein after reheating the steel sheet has an ultimate tensile strength higher than or equal to 1000 MPa.

12. The method as recited in claim 2, wherein after reheating the steel sheet has an ultimate tensile strength higher than or equal to 1000 MPa.

13. The method of claim 2, further comprising, after said reheating and cooling, further reheating the steel sheet to a temperature of 460-500° C., and then hot dip coating with zinc.

14. The method of claim 1, wherein the microstructure includes at least 1.0% ordered ferrite of $DO_3$ structure.

15. The method of claim 1, wherein the microstructure includes more than 3% ordered ferrite of $DO_3$ structure.

16. The method of claim 2, wherein at least 80% of the ordered ferrite of $DO_3$ structure has an average size below 30 nm.

17. The method of claim 2, wherein at least 80% of the ordered ferrite of $DO_3$ structure has an average size below 10 nm.

18. The method of claim 2, wherein the microstructure consists of austenite, ferrite and ordered ferrite of $DO_3$ structure.

19. The method of claim 2, wherein the microstructure consists of austenite, ferrite, ordered ferrite of $DO_3$ structure and intragranular kappa carbides.

20. The method of claim 14, wherein at least 80% of the ordered ferrite of $DO_3$ structure has an average size below 30 nm.

21. The method of claim 20, wherein at least 80% of the ordered ferrite of $DO_3$ structure has an average size below 10 nm.

22. The method of claim 15, wherein at least 80% of the ordered ferrite of $DO_3$ structure has an average size below 30 nm.

23. The method of claim 22, wherein at least 80% of the ordered ferrite of $DO_3$ structure has an average size below 10 nm.

24. The method of claim 1, wherein the providing the cold rolled sheet includes
providing a semi-finished product with said composition;
hot rolling the semi-finished product to obtain a hot rolled sheet, wherein the hot rolling finishing temperature is greater than 800° C.,
cooling the hot rolled sheet at a cooling rate less than or equal to 100° C./s down to a coiling temperature below 600° C.,
coiling the hot rolled sheet at the coiling temperature,
cold rolling the hot rolled sheet with a thickness reduction between 35 to 90% to provide the cold rolled sheet.

25. The method of claim 24, wherein after said coiling and before said cold rolling, the method includes hot band annealing the hot rolled sheet between 400° C. and 1000° C.

26. The method as recited in claim 9 wherein the microstructure includes up to 2% of intragranular kappa carbides inside ferrite grains.

27. A method of production of a cold rolled and heat treated steel sheet comprising the following steps:
providing a cold rolled steel sheet with a composition including the following elements, expressed in percent by weight:
0.15%≤carbon≤0.6%,
4%≤manganese≤20%,
5%≤aluminum≤15%, 0≤silicon≤2%,
aluminum+ silicon≥6.5%,
0.01%≤copper≤2.0%,
a remainder being composed of iron and unavoidable impurities caused by processing;

heating said cold rolled steel sheet up to a soaking temperature between 80° and 950° C. for a duration of less than 600 seconds, then cooling the sheet down to room temperature, reheating the steel sheet at a heating rate of at least 10° C./h to a soaking temperature of 150° C. to 600° C. for a duration of 10 s to 250 h, then cooling the sheet to room temperature, wherein after the reheating the steel sheet has an ultimate tensile strength higher than 900 MPa, and a microstructure of the steel sheet consisting of, in area fraction, 10 to 50% of austenite, a remainder of the microstructure being regular ferrite and ordered ferrite of D0$_3$ structure and optionally up to 2% of intragranular kappa carbides.

28. The method of claim 27, wherein the microstructure includes in area fraction at least 0.1% ordered ferrite of D0$_3$ structure.

29. A method of production of a cold rolled and heat treated steel sheet comprising the following steps:
providing a cold rolled steel sheet with a composition including the following elements, expressed in percent by weight:
0.15%≤carbon≤0.6%,
4%≤manganese≤20%,
5%≤aluminum≤15%,
0≤silicon≤2%,
aluminum+ silicon≥6.5%,
a remainder being composed of iron and unavoidable impurities caused by processing, wherein aluminum, manganese and carbon amounts are such that $0.74 < (Mn/2Al) \times \exp(C) < 2$;

heating said cold rolled steel sheet up to a soaking temperature between 80° and 950° C. for a duration of less than 600 seconds, then cooling the sheet down to room temperature, reheating the steel sheet at a heating rate of at least 10° C./h to a soaking temperature of 150° C. to 600° C. for a duration of 10 s to 250 h, then cooling the sheet to room temperature, wherein after the reheating the steel sheet has an ultimate tensile strength higher than 900 MPa, and a microstructure of the steel sheet consisting of, in area fraction, 10 to 50% of austenite, a remainder of the microstructure being regular ferrite and ordered ferrite of D0$_3$ structure and optionally up to 2% of intragranular kappa carbides.

30. The method of claim 29, wherein the microstructure includes in area fraction at least 0.1% ordered ferrite of D0$_3$ structure.

* * * * *